United States Patent [19]

Kawashima et al.

[11] Patent Number: 5,234,385
[45] Date of Patent: Aug. 10, 1993

[54] BELT TENSION ADJUSTING DEVICE

[75] Inventors: Kazuki Kawashima; Isao Hori; Tomoyoshi Izutsu, all of Iwata, Japan

[73] Assignee: NTN Corporation, Osaka, Japan

[21] Appl. No.: 919,333

[22] Filed: Jul. 27, 1992

[30] Foreign Application Priority Data

| Jul. 31, 1991 | [JP] | Japan | 3-60381[U] |
| Dec. 24, 1991 | [JP] | Japan | 3-106223[U] |
| Dec. 24, 1991 | [JP] | Japan | 3-106241[U] |
| Dec. 27, 1991 | [JP] | Japan | 3-346287 |
| Dec. 27, 1991 | [JP] | Japan | 3-346308 |

[51] Int. Cl.$^5$ ............................................. F16H 7/00
[52] U.S. Cl. ....................................... 474/135; 474/94
[58] Field of Search ............... 474/101, 109, 113–117, 474/133–138

[56] References Cited

U.S. PATENT DOCUMENTS

| 2,622,419 | 12/1952 | McIntyre | 474/94 X |
| 4,981,461 | 1/1991 | Henderson | 474/135 |
| 4,983,145 | 1/1991 | Hirai et al. | 474/135 X |
| 5,131,889 | 7/1992 | Meckstroth et al. | 474/135 X |

Primary Examiner—Thuy M. Bui
Attorney, Agent, or Firm—Nikaido, Marmelstein, Murray & Oram

[57] ABSTRACT

A belt tension adjusting device having a pulley arm having a bore formed with threads, a fixed member and a support shaft extending upwardly from the fixed member into the bore in the pulley arm. A bolt made of a synthetic resin is axially movably mounted on the support shaft and held in thread engagement with the threads formed on the bore. An elastic member is mounted in the bore between the bolt and the support shaft or a member integrally mounted on the support shaft for biasing the bolt in an axial direction. A coil spring is mounted on the pulley arm and having one end thereof in engagement with the pulley arm and the other end with the fixed member.

6 Claims, 6 Drawing Sheets

(a)

(b)

BELT TENSION ADJUSTING DEVICE

This invention relates to a belt tension adjusting device.

A belt tension adjusting device used for a belt for driving auxiliary parts of an automobile engine is provided with a damper field in abutment with a pulley arm to prevent the resonance of the pulley arm due to micro-vibrations of the belt.

Japanese Unexamined Utility Model Publication 63-28949 discloses a belt tension adjusting device in which a screw mechanism is used as a damper to provide a mechanical damping action.

The device proposed in this publication, as shown in FIG. 10, has a cylindrical boss 31 provided at one end of a pulley arm 30 and formed with a hole 32. A support shaft 34 extends upwardly from a fixed member 33 into the hole 32. A bolt 36 is axially slidably mounted on the support shaft 34 through a key-and-groove arrangement 35. The bolt 36 has a thread on its outer periphery which is in threaded engagement with threads 37 formed in the hole 32.

An elastic member 39 is mounted between the bolt 36 and a top wall 38 of the pulley arm 30 to bias the bolt 36 downward. Also, a coil spring 40 is mounted around the boss 31 and has one end thereof in engagement with the pulley arm 30 and the other end with the fixed member 33.

A tension pulley 41 mounted on the pulley arm 30 is pressed against a belt with the spring force produced by the torsion of the coil spring 40. Thus, the tension of the belt is kept constant. Further, the damping effect of the pulley arm 30 is provided by the frictional force which acts on the threaded surface of the bolt 38 due to the spring force of the elastic member 39.

With this type of a belt tension adjusting device, the bolt 36 and the fixed member 33 fixed to the engine block or the like are usually made of iron, while the pivotable pulley arm 30 is made of a light alloy such as aluminium alloy. Since the bolt 36 and the pulley arm 30 are made of different materials, the frictional force acting therebetween tends to be unstable. Thus, it is necessary to supply a lubricating oil such as oil or grease therebetween. But in order to fill the pulley arm 30 with a lubricating oil, a sealing arrangement has to be provided additionally, which would complicate the structure of the device.

With this device, when the pulley arm 30 pivots, the inner peripheral surface of the hole 32 formed in the pulley arm 30 is directly brought into frictional contact with both ends of the support shaft 34, so that the radial load is borne on the support shaft 34. In this arrangement, since the frictional force at the bearing portions is unstable, the bearing portions are prone to seizure. This may lower their load bearing capacity.

Further, with this device, the end of the elastic member 39 is directly in abutment with the top wall 38 of the pulley arm 31. Thus, when the pulley arm 31 pivots, the elastic member 39 is twisted. As a result, it may be deformed to an unfavorable shape. Moreover, during operation, the tension pulley 41 vibrates, excited by the belt, at a high frequency, about several hundred hertz. This micro-vibration is transmitted to the pulley arm 31 and the end faces of the elastic member 39 are liable to fretting wear.

In order to impart the belt tension adjusting device a highly responsive one-way damping property, the threads 37 formed on the bolt 36 and the hole 32 have to have a large helix angle. In order to provide threads having a large helix so as to extend over the entire circumference of the bolt, the bolt 36 as well as the threads 37 has to be rather long. This will increase the entire size of the device. But if the threads were not provided to extend over the entire circumference of the bolt, frictional force will act on the bolt too unevenly to achieve a stable damping action.

This invention was made to solve the above-described problems of the prior art belt tension adjusting device. Its first object is to provide a device which needs no lubricating oil at the thread engaging portion between the pulley arm and the bolt and which can maintain a stable frictional force at the thread engaging portion.

A second object of this invention is to provide a device which can stably bear with high rigidity the radial load while the pulley arm is pivoting.

A third object of this invention is to provide a device which uses a bolt having a short thread length and with which highly responsive damper effect is achievable.

In order to achieve the first object, according to this invention, there is provided a belt tension adjusting device comprising a pulley arm having a bore formed with threads, a fixed member, a support shaft extending upwardly from the fixed member into the bore in the pulley arm, a bolt made of a synthetic resin and axially movably mounted on the support shaft so as to be in thread engagement with the threads formed on the bore, an elastic member mounted in the bore between said bolt and said support shaft or a member integrally mounted on said support shaft for biasing the bolt in an axial direction, and a coil spring mounted on the pulley arm and having one end thereof in engagement with the pulley arm and the other end with the fixed member.

The synthetic resin should be an injection-moldable resin and contain a lubricant.

In order to achieve the second object of this invention, bearing members are mounted between the bore and both ends of the support shafts, the bolt having a thread engaging portion between the bearing members.

In order to achieve the third object of this invention, the threads on the bolt are formed of a plurality of rows of threads.

The respective rows of threads may be arranged so that they may not overlap axially with one another.

In the above-described first means, the threads formed on the bolt and pulley arm are lubricated by the self-lubricity of the synthetic resin forming the bolt. Thus, the frictional force therebetween stabilizes. Also, the wear due to friction can be reduced without the need of a lubricating oil. Thus, no provision for sealing is needed. Adding a lubricating material such as graphite or Teflon to the synthetic resin reduces the wear resistance at the frictional part reduces and improves the wear-resistant properties.

Also, a fibrous reinforcing material such as glass fiber may be added to the synthetic resin to change its linear expansion coefficient so as to be substantially equal to that of the light alloy forming the pulley arm. With this arrangement, the thermal deformation between the damper bolt and the pulley arm can be controlled in a desired manner.

The synthetic resin should preferably be a self-lubricating, highly heat-resistant material which can be easily formed into the damper bolt. For example, polyether-ether ketone (PEEK), polyphenylenesulfide (PPS), polyamide-imide, an injection-moldable thermosetting polyimide, or a thermoplastic polyimide may be used.

In the second means, the bearings should be made of a slide material having a small surface frictional resistance in order to stabilize the frictional force between the pulley arm and the support shaft. As the slide material, a self-lubricating synthetic resin may be used.

If bending moment acts on the engaging portion between the support shaft and the bore in the pulley arm, the resulting radial load is supported on both ends of the support shaft. Thus, by mounting the bearings at both ends of the engaging portion and providing the thread engaging portion of the bolt offset from the bearings, the outer diameter of the device can be reduced without lowering the load bearing capacity.

In the third means, the elastic member is mounted between the fixed support shaft and the bolt movable only axially through the spline. Thus, no turning torque acts on the elastic member and thus no distortion nor deformation occurs. Further, since the pulley arm and the elastic member are not in direct contact, there will be no transmission of micro-vibration and thus no fretting wear.

In the fourth means, by providing a plurality of rows of threads, the bolt can be brought into engagement with a plurality of threads. Thus, even if the length of each thread is short, they can engage the bolt over the entire circumference thereof.

By axially dividing a die for forming the pulley arm, into a plurality of parts, the threads can be formed simultaneously with die casting. Such threads do not overlap axially with one another. In this case, the angle of arc of each thread is given by 360 (n represents number of threads).

Other features and objects of the present invention will become apparent from the following description taken with reference to the accompanying drawings, in which:

FIG. 8a is a sectional view showing the threads formed on the bore;

FIG. 8b is a plan view as viewed from line VII—VII of FIG. 8a;

FIG. 1 shows the first embodiment of the belt tension adjusting device.

Figure 1:
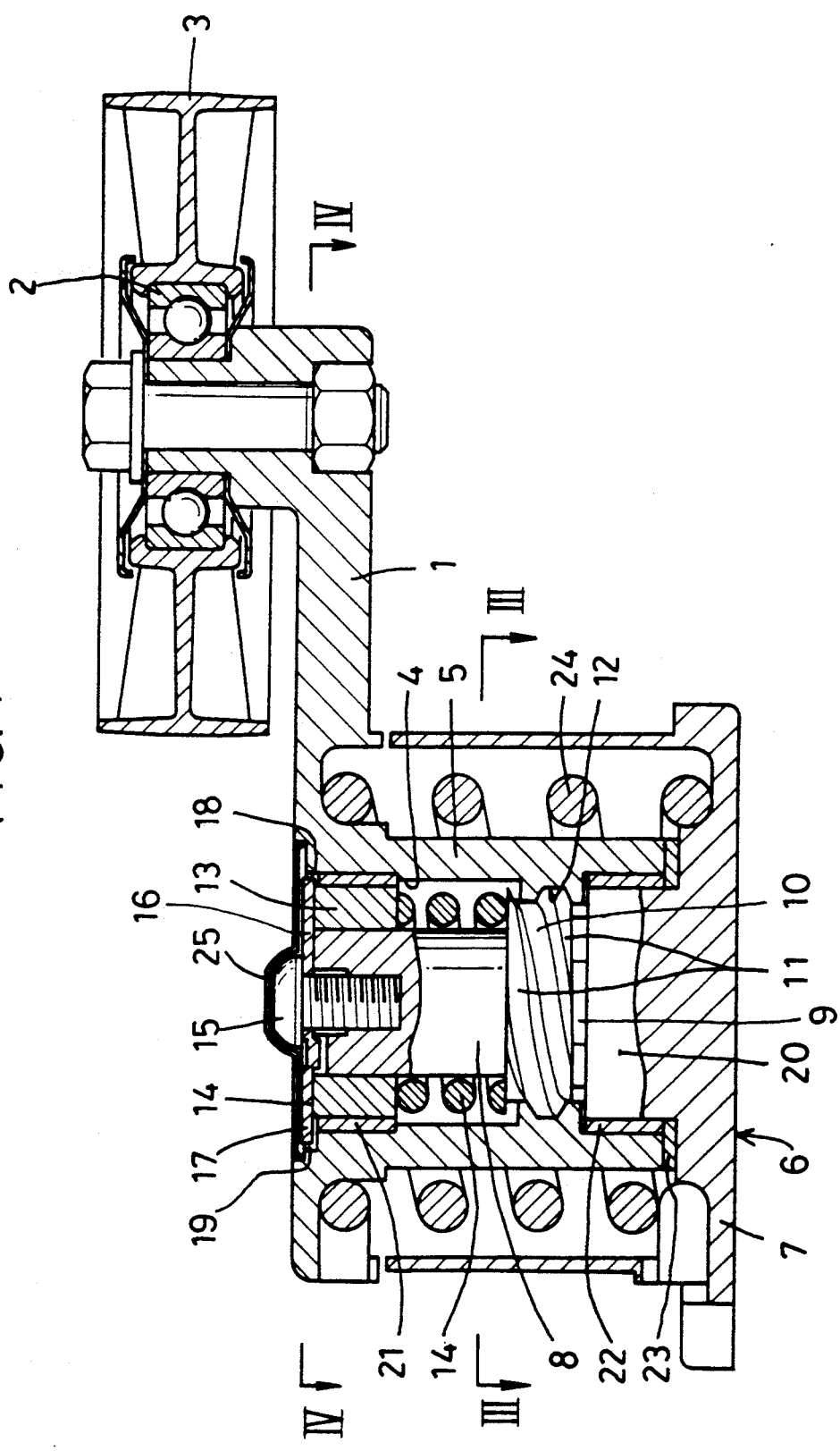
FIG. 1 is a front view partially in vertical section of a first embodiment.

A tension pulley 3 adapted to be pressed against a belt is rotatably mounted on one end of a pulley arm 1 through a bearing 2. A cylindrical guide wall 5 having a bore 4 is provided on the other end which is the center of pivoting motion of the pulley arm 1.

A fixed member 6 fixed to an engine block or the like comprises a base 7 and a support shaft 8 extending from the base 7 into the bore 4 of the pulley arm 1.

Figure 2:
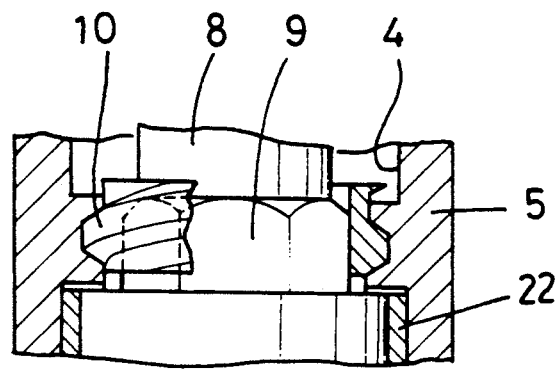
FIG. 2 is an enlarged sectional view of a portion of the same.
Figure 3:
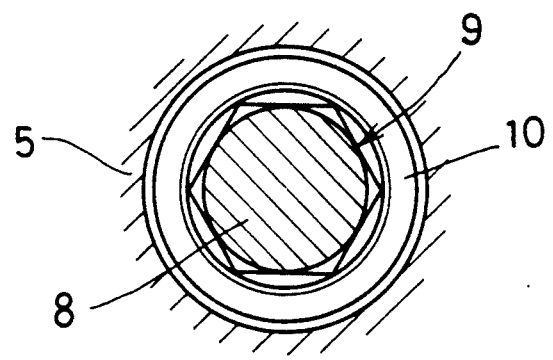
FIG. 3 is a sectional view taken along line III—III of FIG. 1.

As shown in FIGS. 2 and 3, the base portion of the support shaft 8 is formed with a spline 9 in the shape of a hexagonal prism. A damper bolt 10 is fitted on the spline 9. The damper bolt has a hexagonal inner peripheral surface complementary in shape to the spline 9. The damper bolt 10 is movable axially along the support shaft 8 but not rotatable thereabout.

On the outer peripheral surface of the damper bolt 10, there are formed two rows of threads 11 having a helix angle of 10–15 degrees. The threads 11 are in thread engagement with threads 12 formed on the inner peripheral surface of the bore 4 formed in the pulley arm 1.

The damper bolt 10 is formed by injection molding of synthetic resins such as PEEK or PPS containing graphite or Teflon as a lubricant. It also contains a fibrous reinforcing material such as glass fiber in a controlled amount so that its linear expansion coefficient will be equal to that of aluminum alloy. With this arrangement, the difference in deformation with temperature change between the threads 11 on the damper bolt 10 and those on the bore 4 can be kept to a minimum value.

On the other hand, a collar 13 is press-fitted on the upper end of the support shaft 8. Between the collar 13 and the damper bolt 10, an elastic member 14 in the form of a coil spring is mounted in a compressed state, so that the damper bolt 10 is urged in an axial direction (downward in FIG. 1) by the spring force of this member.

Figure 4:
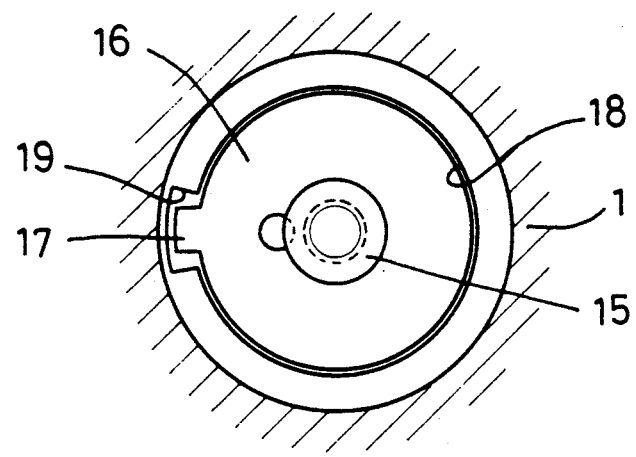
FIG. 4 is a sectional view taken along line IV—IV of FIG. 1.

A locking bolt 15 is screwed into the end of the support shaft 8 with a spacer 16 pressed between the bolt 15 and the collar 13. As shown in FIG. 4, the spacer 16 is provided with a protrusion 17 on the perimeter thereof. It is mounted in an opening 18 of the bore 4 with its protrusion 17 loosely inserted in a recess 19 formed in the side wall at the opening 18, so that the angle of pivoting motion of the pulley arm 1 is restricted to a predetermined value.

Bearings 21 and 22 in the form of radial bearings are mounted, respectively, at top and bottom ends of the support shaft 8, i.e. between the collar 13 and the inner peripheral surface of the bore 4 and between a base portion 20 of the support shaft 8 and the inner peripheral surface of the bore 4. Between the bottom end of the guide wall 5 and the top surface of the base 7, a bearing 23 in the form of a thrust bearing is mounted. The bearings 21, 22 and 23 are made of a slide bearing material such as a synthetic resin. Particularly the thrust bearing operating under large load should preferably be made of an especially wear-resistant synthetic resin as with the damper bolt 10 in order to improve its durability.

The pulley arm 1 is provided outside the guide wall 5 with a coil spring 24 having one end thereof in engagement with the pulley arm 1 and the other end with the base 7 of the fixed member 6. Rust preventive treatment such as Dacrodized treatment or chrome contained zinc coating is applied to the surface of the coil spring 24.

As shown in FIG. 1, a cover 25 is press-fitted in the opening 18 of the bore 4 of the guide wall to keep off dust into the radial bearing parts.

When the tension pulley arm 1 of the bolt tension adjusting device of this embodiment is turned by a predetermined angle with the tension pulley 3 pressed against the belt, the coil spring 24 is compressed and distorted. A predetermined tension is thus applied to the belt by the restoring force of the coil spring 24.

In this balanced state, the damper bolt 10 is urged downward by the elastic member 14 and the urging force is transmitted through the guide wall 5 of the pulley arm 1 to the bearing 23 and supported thereby. In this state, when the pulley arm 1 pivots, the damper bolt 10 moves up and down guided by the spline 9 but is unable to rotate. Thus, friction occurs between the bolt 10 and the threads 12 of the bore 4 and at the bearing 23 supporting the spring force of the elastic member 14.

If from this balanced state, the belt tension increases, the pulley arm 1 pivots compressing the coil spring 24 still further and the damper bolt 10 moves upward compressing the elastic member 14. At the same time, the pulley arm 1 pivots against the biasing force acting on the damper bolt 10 and against the frictional resistance between the damper bolt 10 and the threads 12. Since the pulley arm 1 has to overcome such large resistance, it can pivot only slowly when the bolt tension increases.

On the other hand, if the belt tension decreases from the balanced state, the pulley arm 1 will pivot in a direction opposite to the above under the force tending to untwist the coil spring 24. The damper bolt 10 moves downward, relaxing the elastic member 14. The biasing force acting on the damper bolt 10 acts in a direction to cause the pulley arm 1 to pivot. Only resistance to this pivoting motion is the friction at the thread-engaging portion of the damper bolt 10. Thus, when the belt tension decreases, the pulley arm 1 can pivot without encountering any significant resistance and follow the decrease in belt tension.

The frictional force between the threads 11 and 12 on the damper bolt 10 and the bore 4 is maintained stable due to surface lubrication of the synthetic resin. The biasing force acts uniformly over the entire circumference. Since the frictional force is uniformly distributed, wear of the thread surfaces is kept low. These factors all serve to stabilize the damper characteristics.

Further, since the damper bolt 10 and the pulley arm 1 have substantially the same linear expansion coefficient, their relative position is not affected by deformation even if they are subjected to thermal changes. This improves the stability of thread engagement between the damper bolt 10 and the threads 12.

In this structure, the tension pulley 3 is supported at a different height with respect to the bearings 21, 22 forming the radial bearing. Thus, bending moment will act on the bearings 21 and 22 when the belt tension acts on the pulley 3. But since the radial load resulting from the bending moment acts mostly on the outer ends of the bearings 21 and 22, the capacity to bear radial load is kept high compared with the structure in which bearings are provided over the entire length of the support shaft 8.

By providing the damper bolt 10 and the threads 12 at the central part of the support shaft 8 and the bore 4 to avoid interference with the bearings 21, 22, the diameter of the guide wall 5 and thus the outer diameter of the device can be reduced.

Further, since the elastic member 14 is simply compressed and relaxed between the permanently fixed collar 13 and the damper bolt 10, which is capable of only up-and-down movement, there will be no distortion nor position change. Also, since the elastic member 14 and the pulley arm 1 are kept out of contact, any micro-vibration of the pulley arm 1 is never transmitted to the elastic member 14. Thus, no fretting wear will occur.

Figure 5:
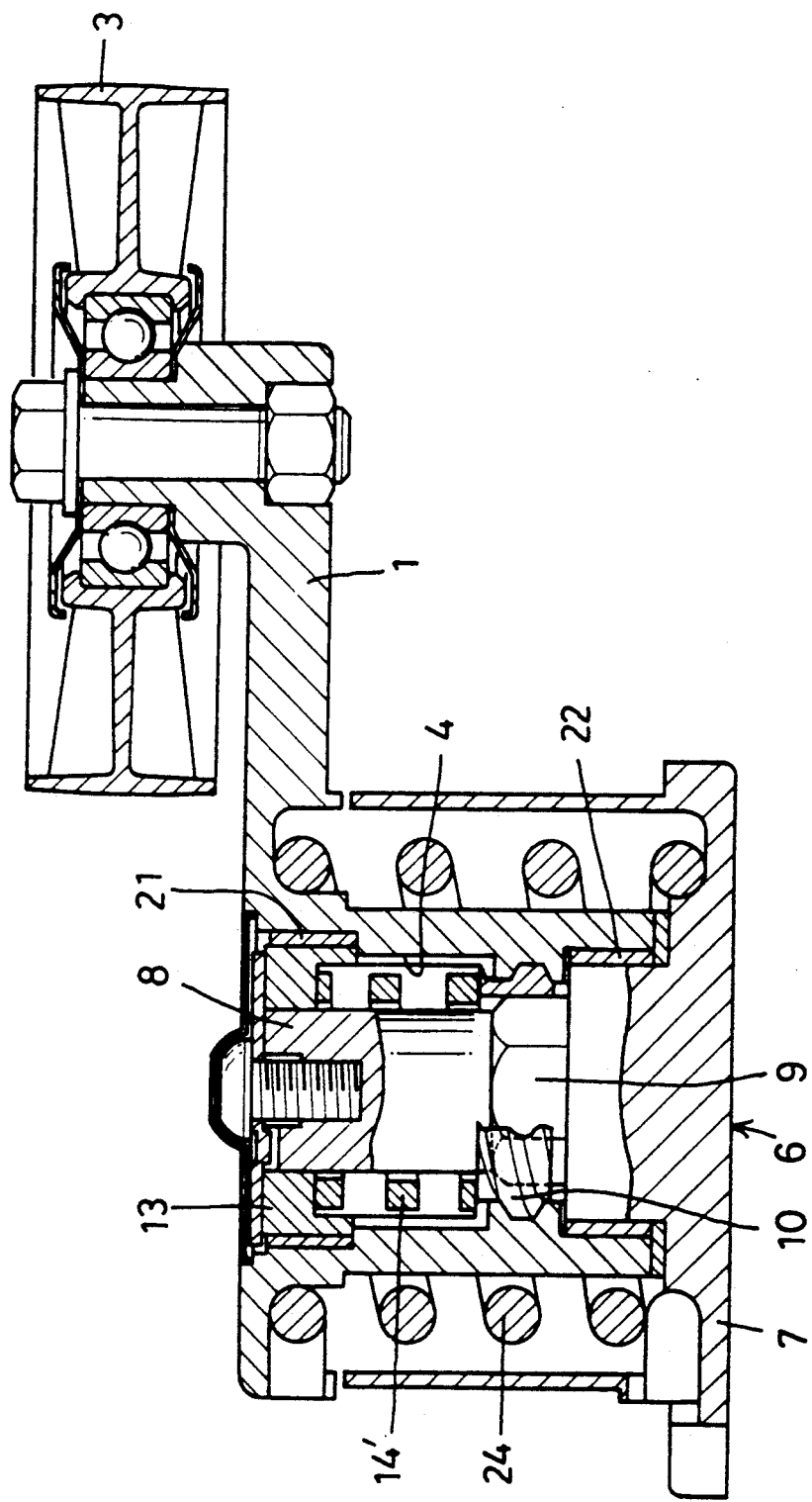
FIG. 5 is a front view partially in vertical section of a second embodiment.

FIG. 5 shows the second embodiment, in which the elastic member 14' is a compression coil spring having a rectangular section. A spring having a rectangular section has a higher load bearing capacity. Otherwise, this embodiment is structurally the same as the first embodiment. Thus, like parts are denoted like numerals and their description is omitted.

Figure 6:
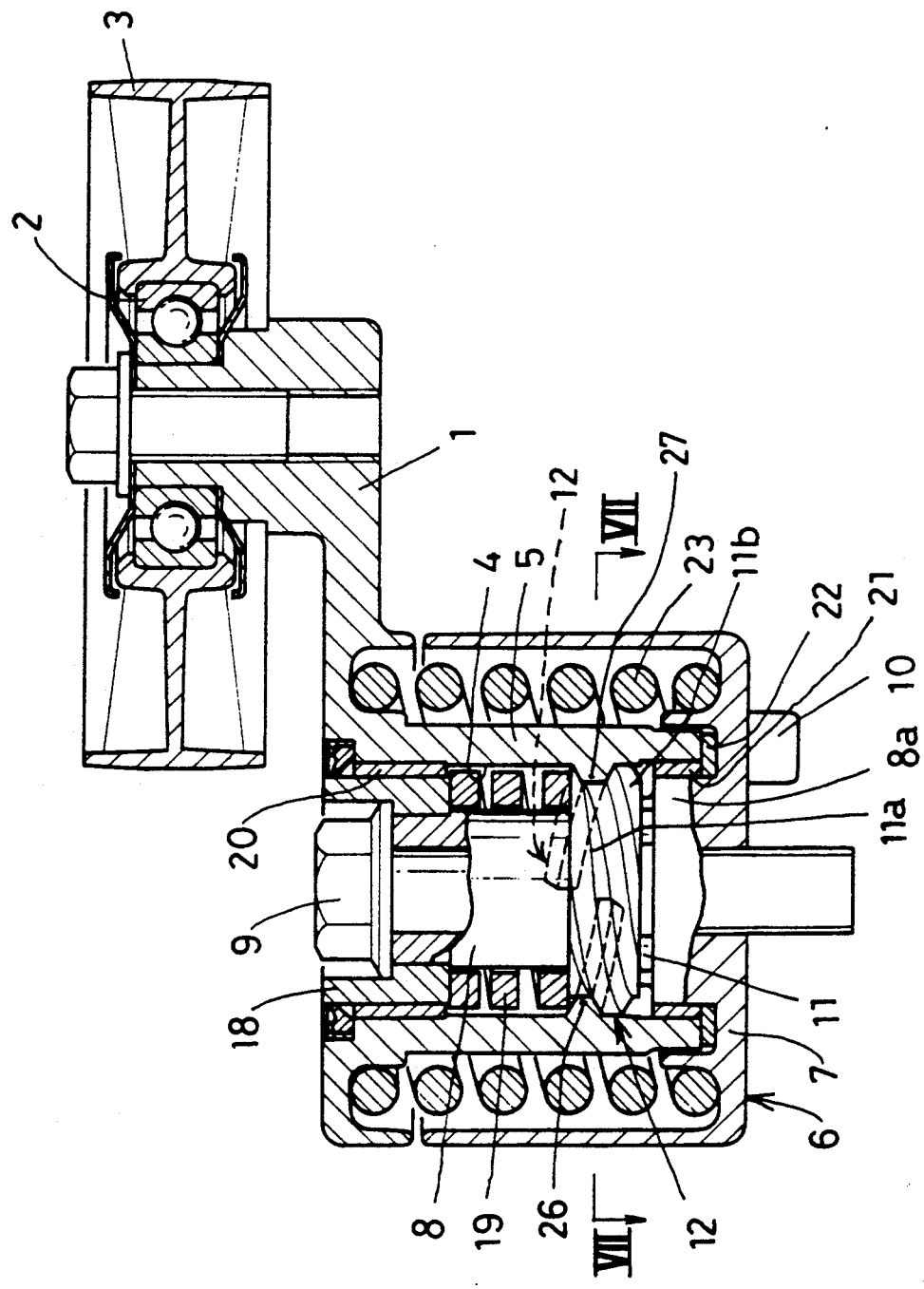
FIG. 6 is a front view partially in vertical section of a third embodiment.
Figure 7:
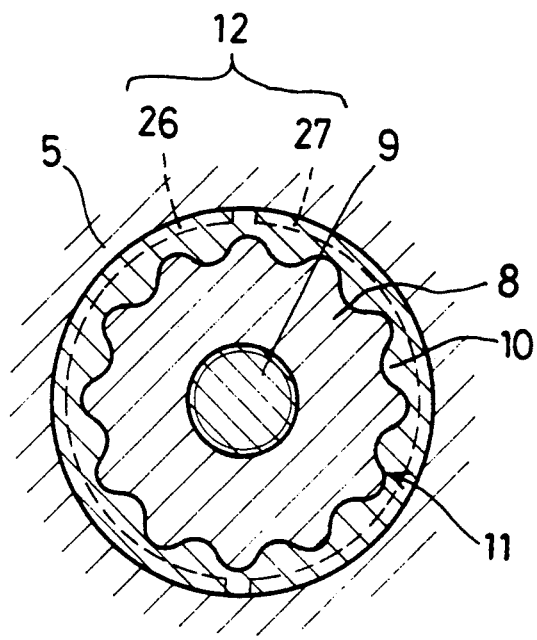
FIG. 7 is a sectional view taken along line VII—VII of FIG. 6.
Figure 8:
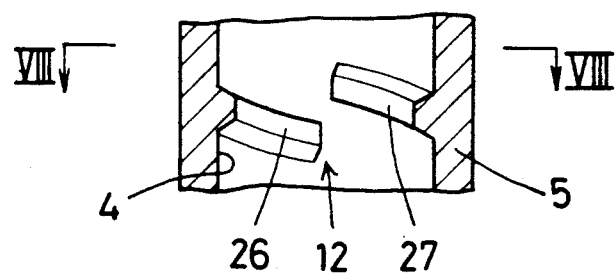
Figure 8:
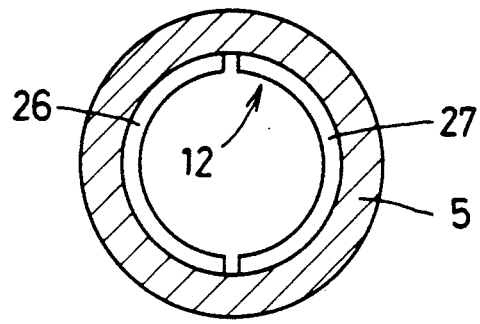

FIGS. 6-8 show the third embodiment, in which threads 12 comprising two rows of threads 26 and 27 are formed on the inner peripheral surface of the bore 4 in the pulley arm 1. The respective threads 26 and 27 of the threads 12 are in threaded engagement with threads 11a and 11b formed on the outer peripheral surface of the damper bolt 10. As shown in FIGS. 8a and 8b, the threads 26 and 27 are formed on the inner peripheral surface of the bore 4 in opposite relation to each other. Each of the threads extends in an arc of 180 degrees or less so that they will not overlap axially. The helix angles of the threads 26 and 27 and the threads 11a and 11b of the bolt 10 are set to 10–15 degrees.

In order that the threads 26, 27 on the pulley arm 1 should not overlap axially, a die for forming the pulley arm 1 by die casting is divided in the axial direction of the bore 4 into a plurality of parts and the die is released axially to form the threads 26 and 27 and at the same time form the pulley arm by die casting.

Figure 9A:
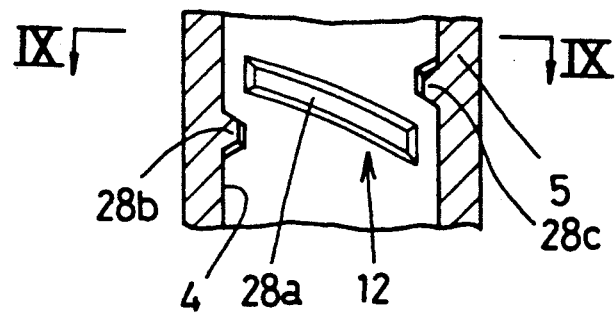
FIG. 9a is a sectional view of another embodiment of the threads.
Figure 9B:
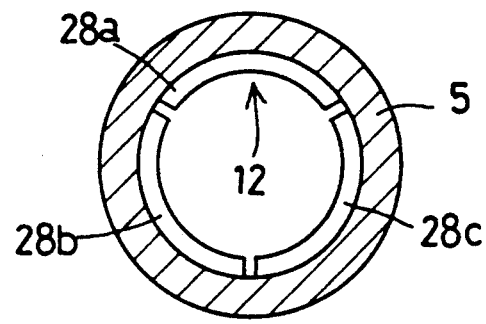
FIG. 9b is a plan view as viewed from line IX—IX of FIG. 9b.
Figure 10:
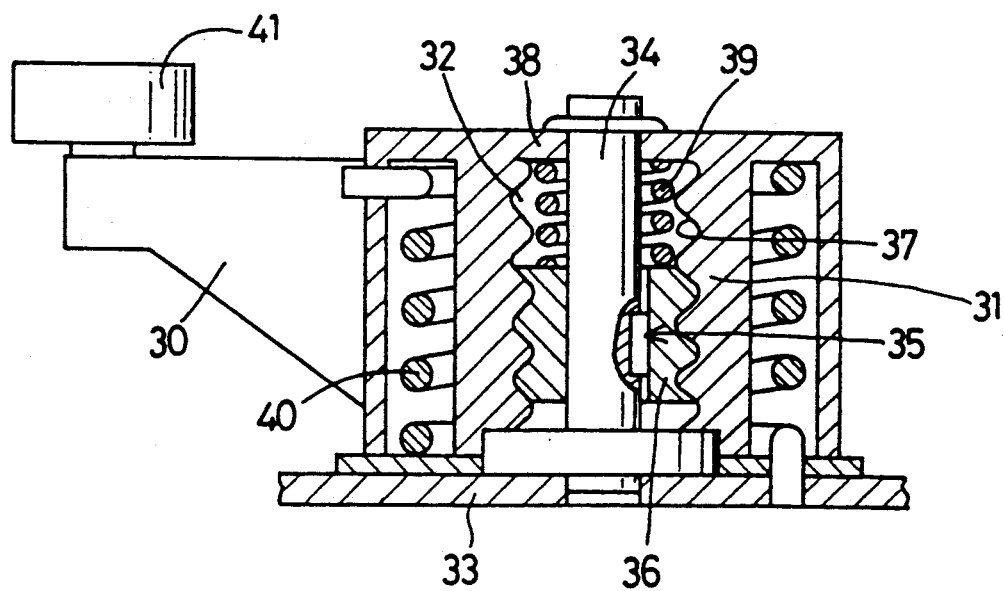
FIG. 10 is a sectional view of the prior art device.

FIGS. 9a and 9b show the fourth embodiment, in which the threads 12 on the pulley arm 1 consist of three rows of threads 28a, 28b and 28c. In this case, in order to prevent the threads 28a, 28b and 28c from overlapping axially with each other, they are formed symmetrically on the inner peripheral surface of the bore 4 so that the arc of each thread will not exceed 120 degrees.

Instead of a compression spring, the elastic member 14 or 14' may be a corrugated washer or a belleville spring or may be made of rubber.

The spline 9 may have a shape other than the shape illustrated. For example, it may comprise a large number of axially extending splines or a combination of key grooves and keys. It may be of any other structure as far as it can prevent the damper bolt 10 from turning while permitting only its axial motion.

Also, instead of the collar 13, the elastic member may be supported on a snap ring or the like fitted on the support shaft 8. If assembly is possible, the support shaft 8 may have a larger diameter portion to support the elastic member directly on the large-diameter portion.

The threads 11 on the damper bolt 10 may comprise four or more rows of threads. By providing such a large number of rows of threads, the threads may be provided so as to extend over the entire circumference around a shorter bolt.

What is claimed is:

1. A belt tension adjusting device comprising a pulley arm having a bore formed with threads, a fixed member, a support shaft extending from said fixed member in to said bore in said pulley arm, a bolt made of a synthetic resin and axially movably mounted on said support shaft so as to be in threaded engagement with said threads formed on said bore, an elastic member mounted in said bore between said bolt and said support shaft or a member integrally mounted on said support shaft for biasing said bolt in an axial direction, and a coil spring mounted on said pulley arm and having one end thereof in engagement with said pulley arm and the other end with said fixed member.

2. A belt tension adjusting device as claimed in claim 1, wherein said synthetic resin is an injection-moldable resin and contains a lubricant.

3. A belt tension adjusting device as claimed in claim 2, further comprising bearing members mounted in said bore between both ends of said support shafts, said bolt having a thread engaging portion between said bearing members.

4. A belt tension adjusting device as claimed in claim 1, further comprising bearing members mounted in said bore between both ends of said support shafts, said bolt having a thread engaging portion between said bearing members.

5. A belt tension adjusting device as claimed in any of claims 1-3 or 4 wherein said threads formed on the inner peripheral surface of said bore comprise a plurality of rows of threads.

6. A belt adjusting device as claimed in claim 5, wherein said respective rows of threads are arranged so that they will not overlap axially with one another.

* * * * *